Nov. 2, 1954  A. M. LIPPISCH  2,693,325
AERODYNAMIC STABILIZING AND CONTROLLING
MEANS FOR DELTA WING AIRCRAFT
Filed Feb. 23, 1951  2 Sheets-Sheet 1

INVENTOR.
BY ALEXANDER M. LIPPISCH
ATTORNEY

Nov. 2, 1954          A. M. LIPPISCH        2,693,325
AERODYNAMIC STABILIZING AND CONTROLLING
MEANS FOR DELTA WING AIRCRAFT
Filed Feb. 23, 1951                         2 Sheets-Sheet 2

INVENTOR.
ALEXANDER M. LIPPISCH
BY
ATTORNEY

United States Patent Office 2,693,325
Patented Nov. 2, 1954

2,693,325

AERODYNAMIC STABILIZING AND CONTROLLING MEANS FOR DELTA WING AIRCRAFT

Alexander M. Lippisch, Cedar Rapids, Iowa, assignor to Collins Radio Company, Cedar Rapids, Iowa, a corporation of Iowa Application February 23, 1951, Serial No. 212,370

2 Claims. (Cl. 244—87)

This invention relates in general to stabilizing devices for high subsonic and supersonic aircraft, and, in particular, to V-shaped fins mounted near the front of a sweep-back wing aircraft.

Experimentation with aircraft in the high subsonic and supersonic speed zones has indicated that certain advantages are obtained by the use of a swept-back wing configuration. The drag of such swept-back wing is generally much less than the conventional straight wing. Experimentation with sweep-back wing configurations has resulted in the development of the so-called delta wing aircraft which comprises a longitudinal fuselage with a rearwardly extending triangular wing. Normally, a vertical fin is mounted above the wing to give directional and rotational stability. For more complete description of delta wing aircraft, reference may be made to the December, 1950 issue of Aero Digest, pages 93–105. The center of lift of a delta wing very nearly approximates the center of area of the wing thus being near the trailing edge of the structure. The center of gravity of an aircraft must be ahead of the center of lift for safety when power fails. The center of gravity in a delta wing plane is therefore slightly forward of the center of lift of the wing. The large sweep-back of the wing produces an increase in rolling moments and it is therefore necessary to put a large vertical fin on such a wing. The majority of the area of the large fin will generally be behind the center of gravity of the craft and if the aircraft is banked to one side a tendency to go into a spiral dive is noted due to the moment of the fin about the center of gravity.

Another difficulty encountered in delta wing aircraft arises from the use of ailerons which are mounted on the trailing edge of the wing. The ailerons serve as elevators to control the aircraft about the pitch axis as well as ailerons to control the aircraft about the roll axis. In order to increase the angle of attack and produce increased lift on the entire wing the ailerons have to be deflected upwardly. At the instant that the ailerons are elevated the lift of the wing is decreased and remains so until this decrease is compensated for and overcome by the increasing angle of attack. This effect results in the aircraft travelling in a wave path going first downwardly and then upwardly after the inertia of the plane has been overcome. In order to eliminate this downward movement of the aircraft when the elevators are lifted it is necessary to accelerate the airplane to a higher speed where aerodynamic forces are large enough to overcome the inertia effects of the plane. This results in longer take-off runs and faster speeds with their inherent dangers.

It is an object of this invention, therefore, to provide stabilizing and controlling means forwardly of the delta wing and the center of gravity.

Another object of this invention is to provide direction controlling means forwardly of the swept-back wing of an aircraft for controlling the plane about the pitch axis.

Yet another object of this invention is to provide stabilizing means forwardly of the center of gravity of a swept-back wing craft for stabilizing the plane about the roll axis.

Yet another object of this invention is to provide stabilizing and control means for greatly increasing the controllability of a swept-back or delta wing aircraft under slow flight conditions.

A feature of this invention is found in the provision for movable forwardly mounted stabilizing fins on a delta wing aircraft so as to obtain stability.

Further objects, features and advantages of this invention will be found in the following description and claims when read in view of the drawings, in which;

Figure 1:
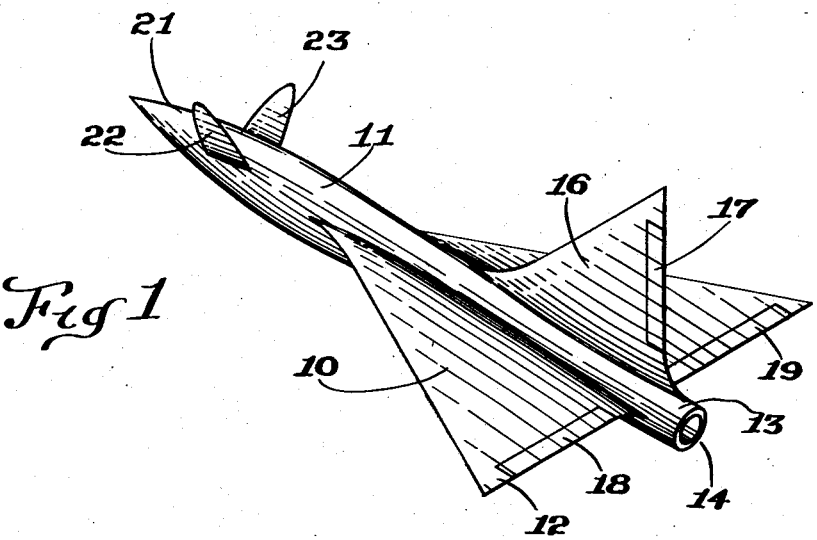
Figure 1 is a perspective drawing of a delta wing aircraft with the forward stabilizing fins of this invention mounted thereon.

Figure 1 illustrates a delta wing aircraft comprising a triangularly shaped wing 10 which is mounted to a bullet-shaped fuselage 11. The wing 10 is mounted substantially in the center of the fuselage 11 and rearwardly thereof so that the trailing edge of the wing 12 is adjacent the rear end 13 of the fuselage. A suitable driving means as, for example, a jet engine is mounted in the fuselage 11 and imparts thrust to the aircraft through the rear opening 14.

A triangularly shaped fin or rudder 16 is mounted to the fuselage 11 above the wing 10 and has a movable rudder 17 mounted in its rear edge. The trailing edge of the wing 10 has mounted therein elevators 18 and 19 on either side of the fuselage. The forward and midportion of the fuselage 11 might carry a pilot or radio control means and the nose might carry explosives, for example.

Mounted adjacent the nose 21 and extending upwardly from either side are fins 22 and 23 which are semi-elliptical in shape. Fins 22 and 23 are pivotally supported on the fuselage 11 and when fins 22 and 23 are rotated such that their leading edges move upwardly, the nose of the aircraft will move upwardly about the pitch axis. Conversely, when fins 22 and 23 are rotated so that their leading edges turn downwardly, the nose of the airplane will be pushed downwardly about the pitch axis. If the left fin 22 has its leading edge pointed downwardly and the right fin 23 has its leading edge pointed upwardly, the nose 21 will be pushed toward the fin 22, thus resulting in movement of the nose and a turn to the left with reference to Figure 1. Conversely, pointing the leading edge of fin 23 downwardly and of the leading edge of fin 22 upwardly results in a turn to the right. It is to be noted that the lift of the wing 10 is not effected by movement of the fins 22 and 23 in that it maintains a constant shape and the control of the airplane is accomplished by the forces exerted on the fins 22 and 23. The fins 22 and 23 are quite a distance from the center of gravity and this allows a small amount of force to control and stabilize the aircraft.

The swept-back wing configuration is primarily designed for extremely fast speeds in the high subsonic and supersonic ranges. However, the plane must be landed and taken off at relatively slow speeds. The reason for this is that it is much safer to contact the ground at 150 miles an hour than it is at 300 miles per hour and also much less power is required to accelerate a plane up to 150 miles an hour on the ground than is necessary to accelerate it to 300 miles an hour. For these reasons the fins 22 and 23 are particularly advantageous during landings and take-offs. After the plane is in the air and a safe flying speed reached, the aerodynamic forces exerted by the fin 16, rudder 17, and elevators 18 and 19 are greatly increased and the fins 22 and 23 are not needed so badly. It might be desirable, therefore, to have the fins 22 and 23 mounted so that they may be withdrawn into the fuselage after the take-off and extended again during landings.

Figure 3:
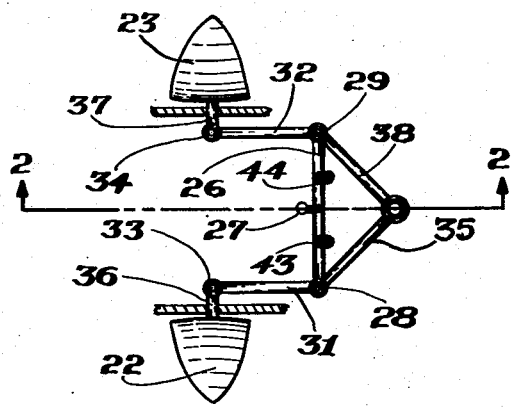
Figure 3 is a detailed top view of the control means for the forward fins.
Figure 2:
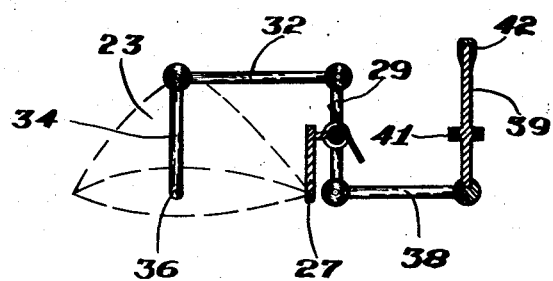
Figure 2 is a detailed side view showing the linkage between controlling means and the forward fins.

Figures 2 and Figures 3 illustrate the linkage for manually controlling the fins 22 and 23. A rudder bar 26 is pivotally supported at its center by a fixed member 27. Vertical levers 28 and 29 are pivotally mounted to either end of the rudder bar 26. The upper end of levers 28 and 29 are connected by ball socket joints to links 31 and 32, respectively. The links 31 and 32 are connected by ball and socket joints to crank arms 33 and 34, respectively. Crank arms 33 and 34 have their lower ends rigidly connected to shafts 36 and 37, respectively, which are connected to the fins 22 and 23.

The lower end of levers 28 and 29 are connected to links 35 and 38, respectively, by ball and socket joints. The links 35 and 38 are connected by a ball and socket joint to the lower end of a control stick 39. The control stick 39 is pivoted for universal motion in a joint 41. A handle 42 is attached to the upper end of the stick 39. Rudder pedals 43 and 44 are mounted to the rudder bar 26.

The linkage shown allows control of the aircraft by stick and rudder in a conventional manner such that when the handle 42 is pulled backwardly the aircraft goes up, when it is pushed forward the nose goes down, and when the stick is pushed to either side the plane banks in that direction. The rudder pedals 43 and 44 also control the turning motion of the aircraft. It is to be understood, of course, that the rudder 17 and ailerons 18 and 19 might be connected to the controls during cruising speeds and disconnected to allow the fins 22 and 23 to control the aircraft at lower speeds.

Figure 5:
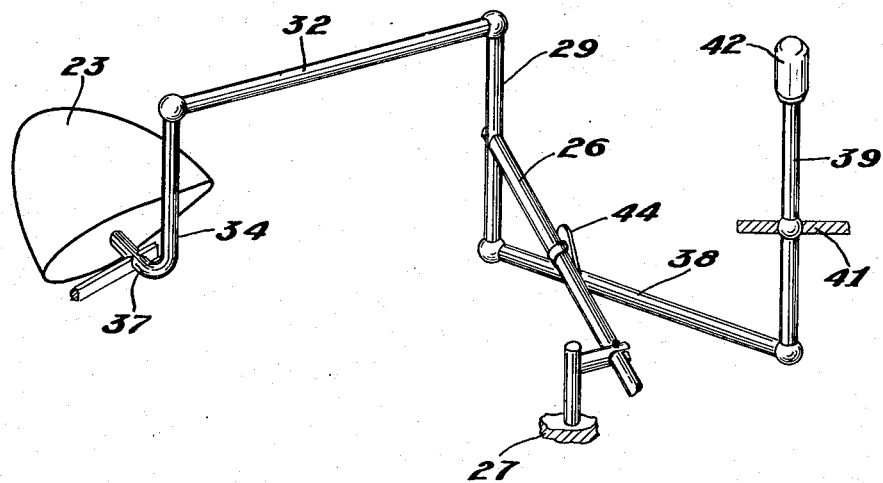
Figure 5 is a perspective view of the control means.

The linkage illustrated in Figures 2, 3, and 5 may be used to turn the aircraft to the right or left or up and down. It is customary to control aircraft by a stick and a pair of rudder pedals. When the stick is pulled backwards, the plane climbs, and when it is pushed forward it dives. In climbing and diving maneuvers, the rudder pedals 43 and 44 are customarily held in the center position. In operation, when the handle 42 is pulled backward the links 35 and 38 will move forward, thus causing the levers 28 and 29 to pivot clockwise with reference to Figure 2. It is to be realized, of course, that the pedals 43 and 44 are held by the feet in their center position. The links 31 and 32 move backwards causing the control surfaces 22 and 23 to rotate clockwise relative to Figure 2 so that they lift the nose of the aircraft and thus cause it to climb. For a diving maneuver, the handle 42 is pushed forward, thus causing the links 35 and 38 to move rearwardly of the aircraft and the levers 28 and 29 to rotate counter-clockwise relative to Figure 2. This tends to rotate the control surfaces 22 and 23 counter-clockwise relative to Figure 2 and pushes the nose downward. It is to be realized, of course, that the rudder pedals 43 and 44 are held by the feet in the center position.

In turning maneuvers, it is customary to utilize a combination of rudder pedals and stick control. The present aircraft may be turned with either the rudder or the stick, but since most pilots are accustomed to coordinating the controls, a combination of rudder and stick may be used. First consider the case where the rudder pedals 43 and 44 are held stationary and the stick 39 is moved sideways to turn the aircraft. Suppose that it is desired to turn to the right relative to Figure 3. The handle 42 will be moved to the right causing the links 35 and 38 to rotate the levers 28 and 29 clockwise and counter-clockwise, respectively. This will cause the forward edge of control surface 22 to turn upward and the forward edge of control surface 23 to turn downward. This combination will cause the aircraft to bank to the right. If a left turn is desired and the rudder bar 26 is held in its center position by the rudder pedals 43 and 44, the handle 42 is moved to the left relative to Figure 3 and the leading edge of the control surface 22 will turn downwardly and the leading edge of the control surface 23 will turn upwardly. This will result in a turn to the left.

A turn to the left or right may be simultaneously accomplished by holding the stick in its center position and applying pressure to the left rudder pedal or right rudder pedal. Likewise, a combination of movement of rudder and stick will establish a bank which will cause the aircraft to turn. The only time that the aircraft will fail to turn upon simultaneous motion of rudder pedals and stick, is when the controls are crossed. That is, when the stick calls for a left turn and the rudder calls for a right turn. Such a control signal is given to a conventional aircraft only under unusual circumstances.

Figure 4:
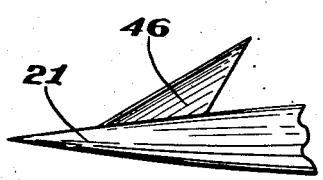
Figure 4 is a modification of this invention.

Figure 4 illustrates a modification of the invention showing only one vertical swept-back fin 46 mounted to the nose 21 of the aircraft. Such a fin would increase the stability about the yaw axis at low speeds.

Although the invention has been described with respect to preferred embodiments thereof, it is not to be so limited as changes and modifications may be made therein which are within the full intended scope of the invention as defined by the appended claims.

I claim:

1. Means for stabilizing and controlling a delta wing aircraft comprising, a first fin pivotally mounted to the forward portion of the fuselage and extending upwardly and outwardly from one side thereof, a second fin mounted adjacent said first fin and extending upwardly and outwardly from the opposite side thereof, control means connected to said first and second fins to rotate them about their pivotal axis and comprising, a control stick mounted intermediate its ends in a universal joint, a rudder bar pivotally supported at its center about a vertical axis, a pair of levers supported at their center on either end of said rudder bar, a first pair of links connecting the lower ends of said pair of levers to the lower end of said stick, a pair of crank arms mounted to the pivotal axis of said fins, and a second pair of links connecting the upper ends of said crank arms to the upper ends of said levers.

2. Means for controlling a delta wing aircraft comprising, a first upwardly and outwardly extending fin pivotally supported on the forward end of the fuselage, a second fin upwardly and outwardly extending from the opposite side of said fuselage, means for controlling the rotation of said first and second fins comprising a pair of crank arms rigidly mounted on said fins at their axes of rotation, a rudder bar pivotally supported at its center about a vertical axis, a control stick mounted in a universal joint intermediate its end, a pair of levers universally mounted at their center to either end of said rudder bar, a first pair of links universally mounted to the lower end of said pair of levers and their opposite ends universally mounted to the lower end of said stick, and a second pair of links connecting the upper ends of said pair of levers to the crank arms.

References Cited in the file of this patent

UNITED STATES PATENTS

| Number | Name | Date |
|---|---|---|
| 1,210,376 | James | Dec. 26, 1916 |
| 1,948,629 | Pitts | Feb. 27, 1934 |
| 2,003,206 | Lewis | May 28, 1935 |
| 2,454,981 | Vint | Nov. 30, 1948 |
| 2,601,962 | Douglas | July 1, 1952 |

OTHER REFERENCES

"Aviation Week," July 4, 1949, page 21.